United States Patent [19]
Aditham et al.

[11] Patent Number: 5,706,349
[45] Date of Patent: Jan. 6, 1998

[54] AUTHENTICATING REMOTE USERS IN A DISTRIBUTED ENVIRONMENT

[75] Inventors: Radhakrishna Aditham; Philip Chang, both of Austin, Tex.; Paul H. Kramer, Rochester, Minn.

[73] Assignee: International Business Machines Corporation, Austin, Tex.

[21] Appl. No.: 398,832

[22] Filed: Mar. 6, 1995

[51] Int. Cl.⁶ .................................................. H04L 9/00
[52] U.S. Cl. .................................................. 380/25
[58] Field of Search ................................ 380/23–25

[56] References Cited

U.S. PATENT DOCUMENTS

| | | | |
|---|---|---|---|
| 4,349,695 | 9/1982 | Morgan et al. | 380/25 |
| 5,196,840 | 3/1993 | Leith et al. | 380/21 |
| 5,220,603 | 6/1993 | Parker | 380/25 |
| 5,226,079 | 7/1993 | Holloway | 380/25 |
| 5,235,642 | 8/1993 | Wobber et al. | 380/25 |
| 5,249,230 | 9/1993 | Mihm, Jr. | 380/23 |
| 5,323,146 | 6/1994 | Glaschick | 380/25 |
| 5,339,403 | 8/1994 | Parker | 380/25 |
| 5,349,642 | 9/1994 | Kingdon | 380/25 |
| 5,454,038 | 9/1995 | Cordery et al. | 380/23 |
| 5,491,752 | 2/1996 | Kaufman et al. | 380/25 |

*Primary Examiner*—Salvatore Cangialosi
*Attorney, Agent, or Firm*—Jeffrey S. LaBaw; David H. Judson

[57] ABSTRACT

In a distributed computing environment, a token is issued to a remote user if a security mechanism initially can determine that the remote user is who he claims to be. Thereafter, a connection between a remote user and an application server requires the application server to first verify that a token associated with a connection request was issued by the security mechanism. If no token is associated with a connection request, or if any token associated with the request was not issued by the security mechanism, the connection is refused.

20 Claims, 3 Drawing Sheets

5,706,349

AUTHENTICATING REMOTE USERS IN A DISTRIBUTED ENVIRONMENT

TECHNICAL FIELD

The present invention relates generally to computer networks and more particularly to a method that enables application servers in a distributed environment to authenticate remote users.

BACKGROUND OF THE INVENTION

It is well known in the art to interconnect multiple computers into a local area network (LAN) to enable such computers to exchange information and share resources. A local area network provides a distributed computing environment in which users can access distributed resources and process applications on multiple computers.

In a distributed environment, it is important that an application server be able to determine unambiguously the source of a particular connection request. In a known architecture, a remote user sets his login name as an environment variable, and this variable is then passed to the application server when the user desires to connect to the server. In such environments, the server has no way to verify the identity of the remote user, i.e., no way to determine whether the the user is who he claims to be. Indeed, the remote user can set the environment variable to any arbitrary string, which the server then has to accept. This known technique, which is undesirable, might be avoided by passing to the server (at bind time) the client's login name and password to thereby enable the server to perform some form of local authentication. But such an approach has a drawback in that the application server must be trusted not to misuse the user's password. In many circumstances, that constraint cannot be enforced.

There remains a need to provide a reliable way for application servers to identify remote users in a distributed environment.

BRIEF SUMMARY OF THE INVENTION

It is therefore a principal object of the invention to provide a security protocol by which application servers can determine the authenticity of remote users in a distributed computer network environment.

It is another object of the invention to enable an application server in a distributed environment to determine unambiguously from whom a particular connection request was transmitted.

It is a more specific object of the invention to provide a security mechanism that recognizes when a connection request from a non-authenticated remote user is being received by the application server and, in such event, inhibiting the connection to the server.

It is a further object of the invention to provide a security mechanism that utilizes an existing local operating system authentication facility to initially authenticate remote users.

It is another object to provide a method for managing communications between one or more remote users and an application server of a local processing system in a distributing computing environment.

It is yet another object of the invention to enable application servers to authenticate remote users in a distributed environment without the requirement of a distinct server that maintains a database of security information.

Further, it is still another object to implement the security techniques of the invention across heterogenous computer platforms without impairing interoperability among the various machines making up the network.

These and other objects are provided in a method for managing communications between remote users and an application server of a local processing system. Generally, the method begins by authenticating one or more remote users. This authentication takes place by having a remote user pass its login name and password to a security mechanism running on the local processing system. The security mechanism preferably utilizes a local operating system authentication facility to authenticate the remote user, and then it returns a token to the remote user to complete the authentication. The token is typically a random string indicating that the remote user who receives the token has been authenticated for a particular communication session or for a particular communication. Thereafter, it is assumed that some remote user in the environment desires to communicate with the application server. When a connection call from that user is received by the application server, a determination is made whether a token associated with the call was issued by the security mechanism. This is achieved by having the application server pass the received token to the security mechanism, which verifies the token's origination. If the token associated with the connection call was issued by the security mechanism, the remote user is connected to the application server; otherwise, the connection is refused. When the connection is successfully established, further security is provided by associating the token with messages that are provided from the authenticated user to the application server.

Thus, according to the invention, a token is issued to a remote user if the security mechanism initially can determine that the remote user is who he claims to be. Thereafter, a connection between a remote user and the application server requires the application server to first verify that a token associated with a connection request was issued by the security mechanism. If no token is associated with a connection request, or if any token associated with the request was not issued by the security mechanism, the connection is refused.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

As described above, the present invention is directed generally to managing communication between client and server processes in a computer network providing a distributing environment in which users can access distributed resources and process applications on multiple heterogenous computers.

Figure 1:
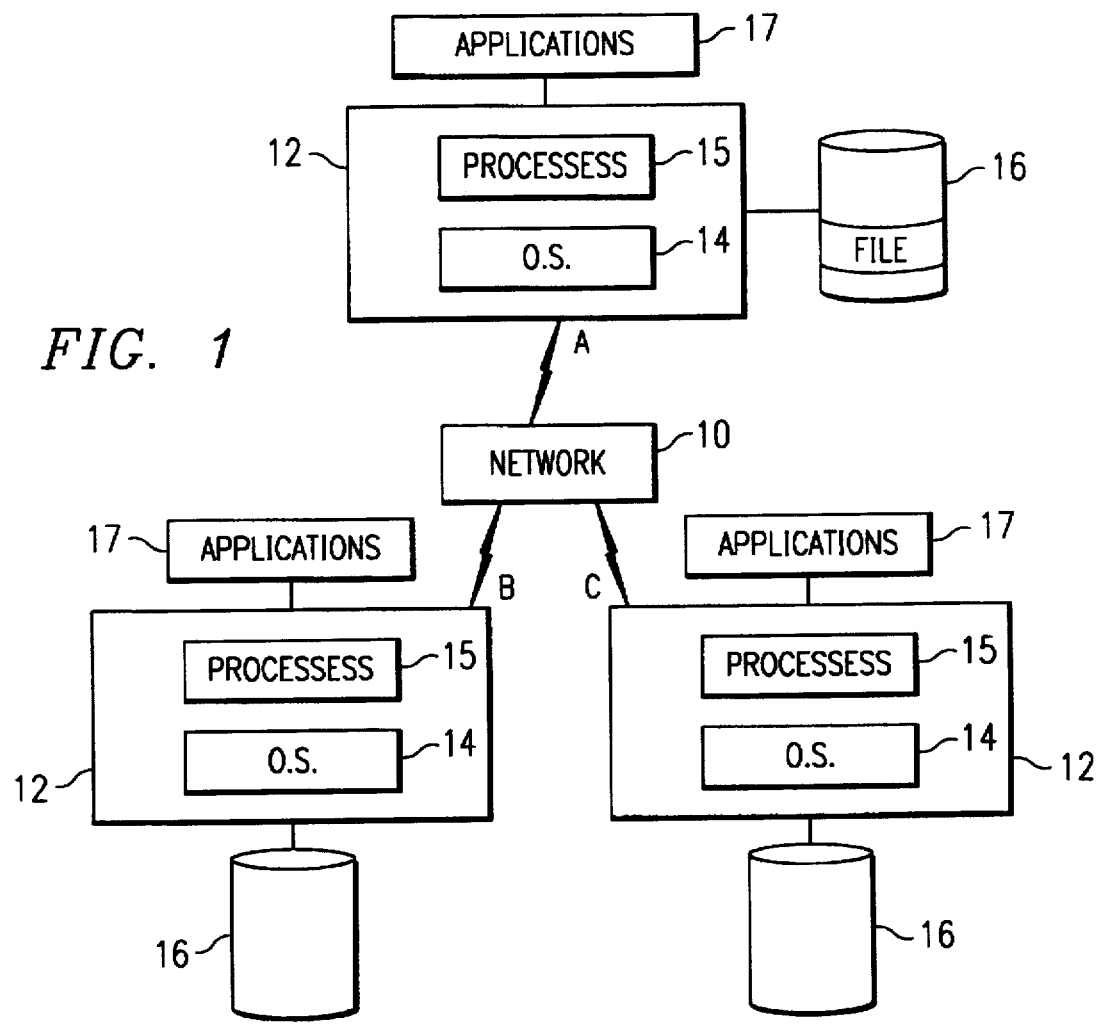
FIG. 1 illustrates a computer network in which the present invention is implemented.

A known distributed environment is illustrated in FIG. 1 and includes two or more nodes A, B and C connected through a communication link or network 10. Each node includes a computing system comprising processing unit 12, operating system 14, one or more processes 15, disk file system 16 and application software 17. The network 10 can be a local area network (LAN) or a wide area network (WAN), the latter comprising a switched or leased teleprocessing (TP) connection to other nodes or to a network of systems under IBM's Systems Network Architecture (SNA). A simplified description of local area networks may be found in a book by Larry E. Jordan and Bruce Churchill entitled *Communications and Networking for the IBM PC*, published by Robert J. Brady (a Prentice-Hall Company) (1983).

Each of the computing systems may be a single user system or a multi-user system, although generally the present invention will be implemented in a multi-user system environment. For example, each processing system may be a RISC System/6000® (a reduced instruction set or so-called RISC-based workstation) running the AIX® (Advanced Interactive Executive) operating system. The AIX operating system is compatible at the application interface level with AT&T's UNIX® operating system, version 5.2. The various models of the RISC-based personal computers are described in many publications of the IBM Corporation, for example, *RISC System/6000, 7073 and 7016 POWERstation and POWERserver Hardware Technical Reference*, Order No. SA23-2644-00. The AIX operating system is described in *AIX Operating System Technical Reference*, published by IBM Corporation, First Edition (November, 1985), and other publications. A detailed description of the design of the UNIX operating system is found in a book by Maurice J. Bach, *Design of the Unix Operating System*, published by Prentice-Hall (1986). The invention may also be implemented on other multiuser machines such as the IBM AS/400® running the OS/400® operating system.

In a particular implementation, not meant to be limiting, the network of FIG. 1 includes a plurality of IBM multi-user AS/400 workstations interconnected under IBM's Distributed System Object Model (DSOM™) architecture, which is an object-oriented programming system. This known object oriented programming system allows rapid development, implementation and customization of so-called objects. Each new object has certain data attributes and processes that operate on that data. Data is said to be "encapsulated" by an object and can only be modified by the object methods, which are invoked by sending a message to an object identifying the method and supplying any needed arguments. Methods are invoked by receiving messages from other objects. The system has a message router that routes messages between objects.

Details of the DSOM architecture are described in the User's Guide and Reference Manual to the SOMobjects™ Developer Toolkit, published by IBM Corporation, First Edition (1994), which are incorporated herein by reference. The above-referenced publications are available from IBM Corporation as No. SC23-2680-01 for the DSOM User's Guide and No. SC23-2681-01 for the DSOM *Reference Manual*. Of course, other system architectures are likewise useful to implement the network of FIG. 1.

Figure 2:
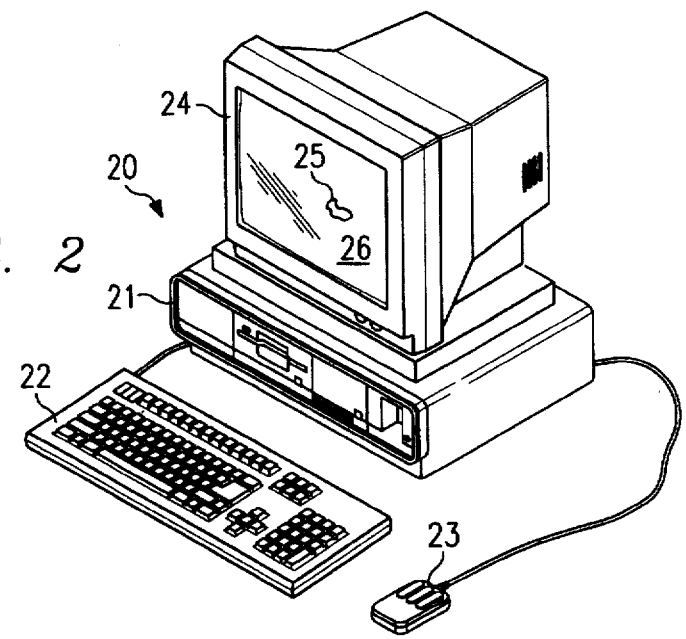
FIG. 2 illustrates a computer used in the computer network of FIG. 1 and comprising a system unit, a keyboard, a mouse and a display, for use in implementing the present invention.

FIG. 2 illustrates one of the computing systems of FIG. 1. The computer system 20 comprises a system unit 21, a keyboard 22, a mouse 23 and a display 24. The screen 26 of display device 24 is used to present a graphical user interface (GUI). The graphical user interface supported by the operating system allows the user to use a point and shoot method of input, i.e., by moving the mouse pointer 25 to an icon representing a data object at a particular location on the screen 26 and pressing on the mouse buttons to perform a user command or selection.

Figure 3:
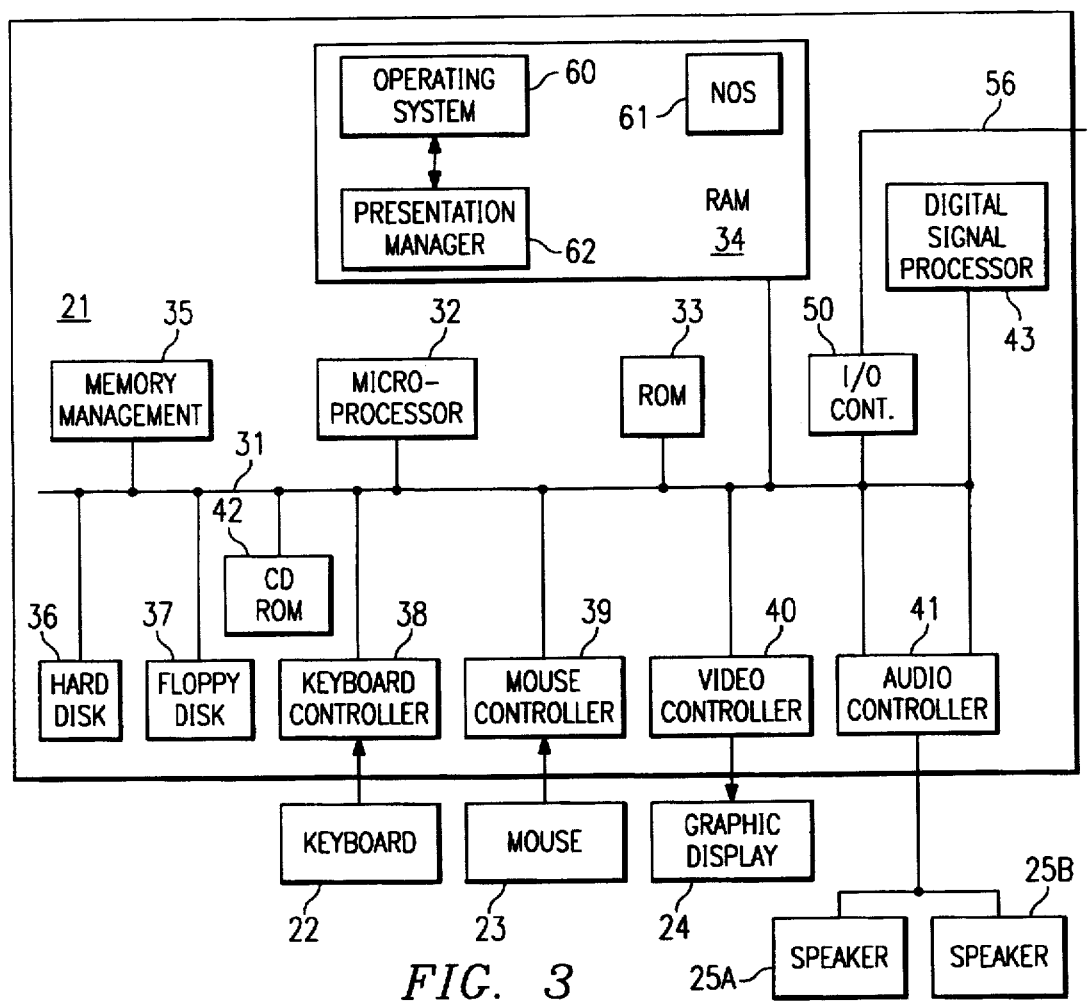
FIG. 3 is an architectural block diagram of the computer illustrated in FIG. 2.

FIG. 3 shows a block diagram of the components of the personal computer shown in FIG. 2. The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. A microprocessor in the IBM PS/2 series of computers is one of the Intel family of microprocessors including the 386 or 486 microprocessors. Other microprocessors included, but not limited to, Motorola's family of microprocessors such as the 68000, 68020 or the 68030 microprocessors and various RISC microprocessors such as the PowerPC™ microprocessor manufactured by IBM, and others made by Hewlett Packard, Sun, Intel, Motorola and others may be used in the specific computer.

The ROM 33 contains among other code the Basic Input-Output system (BIOS) which controls basic hardware operations such as the interaction and the disk drives and the keyboard. The RAM 34 is the main memory into which the operating system and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 31, is used to store a large amount of data, e.g., a multimedia program or large database.

Also connected to this system bus 31 are various I/O controllers: the keyboard controller 38, the mouse controller 39, the video controller 40, and the audio controller 41. The keyboard controller 38 provides the hardware interface for the keyboard 22, the mouse controller 39 provides the hardware interface for the mouse 23, the video controller 40 is the hardware interface for the display 24, and the audio controller 41 is the hardware interface for the speakers 25a and 25b. An I/O controller 50 such as a Token Ring Adapter enables communication over the local area network 56 to other similarly configured data processing systems.

In the DSOM architecture, a manager process called daemon SOMDD runs on every node in the network on which an application server runs. The main task of the SOMDD process is to start the application server (if necessary) and to manage server binding handles. A binding handle specifies the location of the server process as a network address and the port number where the server process is running. To communicate with an application server, a client process (which may or may not be running on the same machine) needs to know the port on which the application server is registered. To accomplish this, the client issues a Get_binding() request message to the SOMDD process, which if necessary registers the application server and sends the binding information (in the form of a binding handle) to the client. After the SOMDD process returns the binding information to the client, subsequent connections between the client and the application process may be effected by the client issuing a Connect() call to the application server.

With the above background, the present invention can now be described in detail. Because the application server is a sensitive resource, it is desired that it be able to trust clients who seek connections therewith. Although it is assumed that the network is physically secure (thus making encryption unnecessary), prior art techniques do not provide adequate security. Thus, according to the invention the SOMDD process (or some equivalent manager process) is enhanced to include a security protocol routine that enables the application server to authenticate remote clients. The security protocol may be a piece of standalone code (i.e. a series of instructions) instead of part of the manager process itself. Typically, however, the security protocol of the present invention (with or without the manager process) will be supported on the same local processing system as the application server but will run as a standalone process.

Figure 4:
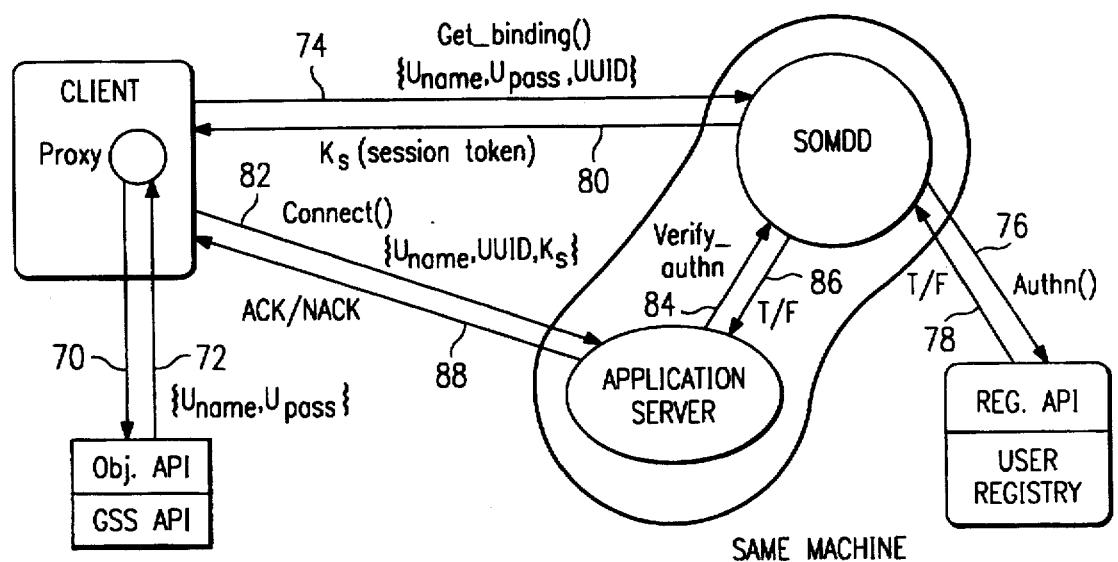
FIG. 4 illustrates a combined schematic and flow diagram illustrating the method for managing communications between a remote user and an application server according to the present invention.

The operation of the inventive protocol in the context of a DSOM architecture is illustrated in FIG. 4. This example is merely representative, and the invention is not limited to this particular platform. The method begins at step 70 in the Get binding() call to initialize a string, referred to herein for convenience as object $\{U_{name}, U_{pass}\}$. Generally, the client's name and password will be stored in the system in a secure manner and thus a security scheme (such as the General Security Service Application Programming Interface (GSS API)) is called to extract the necessary information. This step can be omitted. At step 72, the GSS API returns to the client an initialized data string, referred to herein as $\{U_{name}, U_{pass}\}$, which data string may be in object form or in the form of a data structure. This data string includes a login name $\{U_{name}\}$, and password $\{U_{pass}\}$ in scrambled form. A universal unique identifier (UUID) is generated and added to the name and password string to form a string, referred to herein as $\{U_{name}, U_{pass}, UUID\}$, and this string likewise may be an object or other suitable data structure. Universal unique identifiers (UUID's) are created by a UUID generator routine. A UUID is essentially a long random number. Inclusion of the UUID insures the uniqueness of the transmitted string. At step 74, the string $\{U_{name}, U_{pass}, UUID\}$ is overlaid on the Get_binding() request message to the SOMDD process.

As noted above, the SOMDD process resides on each node of the network where an application server resides. The SOMDD process as shown in FIG. 4 has been enhanced according to the invention to include the novel security routine. As discussed above, the inventive technique may also be implemented in a standalone module instead of being incorporated into the SOMDD process. FIG. 4 is thus representative of one implementation method.

The SOMDD process detects that there is a $\{U_{name}, U_{pass}, UUID\}$ data string in the incoming message. In response, the SOMDD process extracts the $U_{name}$ and $U_{pass}$ information and, at step 76, invokes an operating system specific authentication API using an Authn() message. In the preferred implementation, the inventive protocol uses the DSOM User Registry (or some equivalent user identification construct) that is supported by the operating system of the local processing system itself although, if necessary, a remote procedure call may be used to effect remote authentication if no local registry is present. At step 78, the registry API returns TRUE or FALSE depending on whether the login name and valid password are defined in the User Registry. If the registry API is returned FALSE, the SOMDD process returns to the client an authentication failure message. If in step 78 the registry API is returned TRUE, the SOMDD process generates a string $\{K_S\}$, which is typically random (but may also be deterministic).

In particular, this preferably random string is referred to as a "token", which functions to "confirm" that the remote user bearing the token is who he claims to be (provided the token is recognized as will be seen). The word "token" is not meant to have any limiting connotation. At step 80, the SOMDD process passes the token (along with the binding information for the application server) back to the remote user, and the remote user is then said to be "authenticated" for the session or the particular communication. String $\{K_S\}$ may be an 8-byte string that is unique to each session or communication. Each program invoked by a client may receive a particular token. The SOMDD process also stores locally both a copy of the random string $\{K_S\}$ and the UUID.

Assume now that the client DSOM runtime makes a Connect()call to the application server. If the client received a token $\{K_S\}$ from the SOMDD process in step 80, it initializes a $\{U_{name}, UUID, K_S\}$ data string (with $U_{name}$ being the same as originally sent to the SOMDD process) and, at step 82, the client sends the application server this string overlaid on a SOMD_CONNECT request. The application server DSOM runtime code detects the $\{U_{name}, UUID, K_S\}$ string and, at step 84, makes a call to the SOMDD process to verify if SOMDD really issued the token $K_S$ for the session UUID. In particular, the SOMDD process verifies the request by searching for the same $\{UUID, K_S\}$ in its internal storage. The response to this inquiry is returned to the application server at step 86. If a match is found, the SOMDD process returns TRUE to the application server; otherwise FALSE is returned. If the SOMDD process returns TRUE, the application server accepts the connection. If the SOMDD process returns FALSE, an authentication failure message is sent back to the client and the connection is refused.

Figure 5:
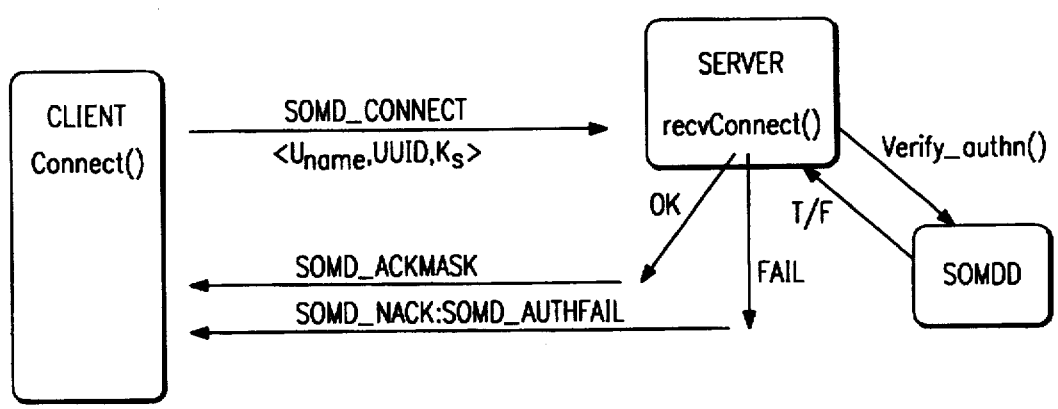
FIG. 5 illustrates the connection protocol that occurs between the remote user and the application server in the method of FIG. 4.

One particular messaging protocol implemented upon a DSOM runtime connect request is illustrated in FIG. 5. As discussed above, when the client desires to connect to the application server, it transmits the $\{U_{name}, UUID, K_S\}$ string along with the SOMD_CONNECT request. The application server issues a Verify_authn() message to the SOMDD process, which then verifies whether or not the client has been previously authenticated as discribed above. A TRUE or FALSE indication is then returned to the server. If the client has been previously authenticated (i.e. if the $\{UUID, K_S\}$ is located in the SOMDD storage), a recvConnect() message SOMD_ACKMASK is sent to the client and the connection is accepted (see step 88). If the client has not been previously authenticated (i.e. if the $\{UUID, K_S\}$ is not located in the SOMDD storage), a recvConnect()message SOMD_NACK:SOMD_AUTHFAIL is sent to the client and the connection is refused.

When the connection is successfully established, the DSOM runtime on the client side associates each message to the application server with the token $\{K_S\}$ and the DSOM runtime on the server side verifies this token with the information cached during the Connect() call.

According to the present invention, each client that desires to talk to the server in an authenticated manner (or if a server accepts only authenticated calls), first passes its login name and password to the application server manager process. The name and password are scrambled before being sent on the network. Preferably, the manager process authenticates the remote user by invoking a local operating system specific API to a User Registry. If the manager process can authenticate the user, it returns a session token. The client seeking to connect to the application server thereafter passes the token to the server to seek to prove its identity. The application server then calls the manager process to verify that the process really issued the token received. If the manager process verifies that it issued the token (by locating it in its database), the application server accepts that the client has been previously authenticated and is who he claims to be. Otherwise, the application server rejects the connection.

The present invention provides several advantages over the art. Foremost, the technique enables an application server in a distributed environment to determine unambiguously from whom a particular connection request was transmitted. A dedicated server that maintains a database of security information is not required, and preferably the initial authentication of a remote user is effected in the local processing system using the existing operating system-specific local authentication API. Communications between remote users and the application server are controlled by so-called "tokens", which provide the server with evidence that the remote user is who he claims to be. Such communications may be carried out using encryption techniques for further security. The invention operates across heterogenous computer platforms without impairing interoperability.

Moreover, although the invention has been described in the context of a local processing system supporting a multi-user operating system with local authentication facility, such description is not meant to be limiting. As noted above, the authentication steps of the security protocol may be implemented using a procedure call to a remote authentication facility if a local user registry does not exist on the local processing system. Also, the protocol may be implemented in a network that includes single-user as opposed to just multi-user machines. In some circumstances, it may also be desirable to implement some of the functionality of the protocol in the application server itself, although generally it will be more desirable for the protocol to be completely independent of the system on which it is running.

One of the preferred implementations of the present invention is as a set of instructions in a code module resident in the random access memory of the personal computer or workstation. This set of instructions may be part of the manager process (in one illustrative embodiment, the SOMDD process) which is supported on the local processing system to start the server and to provide binding information to clients. Until required by the computer system, the set of instructions may be stored in another computer memory, for example, in a hard disk drive, or in a removable memory such as an optical disk (for eventual use in a CD ROM) or floppy disk (for eventual use in a floppy disk drive). In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Although the invention has been described in terms of a preferred embodiment in a specific operating system and network environment, those skilled in the art will recognize that the invention can be practiced, with modification, in other and different operating systems and network architectures with the spirit and scope of the appended claims. The present invention, however, is not to be construed as limited to the DSOM architecture and thus in a more general sense the invention should be broadly construed to cover any network environment where application servers are required to or desire to authenticate remote users. As used herein, the word "remote" should not be construed as requiring the user to located on a physically distinct machine, although usually that will be the case. A "remote user" may also be a client process running on the same local processing system as the application server.

Having thus described our invention, what we claim as new and desire to secure by Letters Patent is set forth in the following claims.

We claim:

1. A method for managing communications between remote users and an application server in a distributed computing environment, the application server supported in a local processing system having a local authentication facility, comprising the steps of:
   (a) issuing a token to each remote user whose identity is authenticated in the local processing system using the local authentication facility;
   (b) in response to a call from a remote user, determining whether a token associated with the call was issued to the remote user authenticated by the local authentication facility of the local processing system; and
   (c) connecting the remote user to the application server if the token was issued to the remote user authenticated by the local authentication facility of the local processing system.

2. The method as described in claim 1 wherein the identity of the remote user is authenticated by determining whether a user name and password are present in a user registry of the local processing system.

3. The method as described in claim 2 wherein the user name and password are provided to the local processing system in a data string forming a part of a binding handle request message.

4. The method as described in claim 3 wherein the data string also includes a universal unique identifier (UUID).

5. The method as described in claim 4 wherein the token and the UUID are stored in the local processing system to enable determination of whether the token associated with the call was issued to the remote user by the local processing system.

6. The method as described in claim 1 wherein the remote user is refused connection to the application server if the token was not issued to the remote user by the local processing system.

7. The method as described in claim 1 wherein the token is a random string associated with a particular computing session.

8. A method, using a security mechanism, for managing communications between remote users and an application server in a distributed computing environment, wherein the security mechanism and the application server are supported in a local processing system having a local authentication facility, comprising the steps of:
   (a) issuing one or more tokens to a remote user if the remote user's identity is authenticated by the security mechanism using the local authentication facility;
   (b) in response to a call from a remote user, determining whether a token associated with the call was issued to the remote user by the security mechanism;

(c) connecting the remote user to the application server if the token was issued to the remote user by the security mechanism; and (d) refusing connection to the application server if the token was not issued to the remote user by the security mechanism.

9. The method as described in claim 8 wherein the remote user's identity is authenticated by determining whether a user name and password are present in a user registry associated with the local authentication facility.

10. The method as described in claim 9 wherein the user name and password are provided to the security mechanism in a data string forming a part of a binding handle request message.

11. The method as described in claim 10 wherein the data string also includes a universal unique identifier (UUID).

12. The method as described in claim 11 wherein the token and the UUID are maintained in a storage associated with the security mechanism.

13. The method as described in claim 8 wherein each token issued to the remote user is a random string.

14. The method as described in claim 8 wherein the step of determining whether a token associated with the call was issued to the remote user by the security mechanism comprises the steps of:

transmitting the token from the remote user to the application server;

having the application server send the token to the security mechanism; and searching a database associated with the security mechanism to determine if the token was originated by the security mechanism.

15. A method to enable an application server in a distributed network environment to verify the identity of remote users, the application server supported in a local processing system having a local authentication facility, comprising the steps of:

(a) having a remote user transmit a data string to a security mechanism supported in the local processing system, the data string including at least some information uniquely identifying the remote user;

(b) having the security mechanism issue a token to a remote user if the remote user's identity is authenticated by the security mechanism using the local authentication facility; and (c) using the token to control further connection of the remote user to the application server.

16. The method as described in claim 15 wherein the data string includes a user name, a user password and a random bit string.

17. The method as described in claim 16 wherein the data string is an object.

18. In a network providing a distributed computing environment in which users access distributed resources and process applications, the network including a local processing system supporting an application server and having a local authentication facility, comprising:

means for issuing a token to each remote user whose identity is authenticated using the local authentication facility; and means responsive to receipt of the token by the application server for controlling subsequent connection of the remote user to the application server.

19. A computer network providing a distributed computing environment in which users access distributed resources and process applications, comprising:

a local computer system having an application server and supporting an authentication facility;

a client process;

a security protocol means to enable the application server to authenticate the client process, comprising:

means supported on the local computer system for issuing a token to the client process if the identity of the client process is authenticated using the authentication facility; and means responsive to receipt of the token by the application server for controlling connection of the client process to the application server.

20. A program storage device readable by a processor and tangibly embodying a program of instructions executable by the processor to perform a method for managing communications in a distributed computing environment including an application server and one or more client processes, the application server supported in a local processing system having an authentication facility, the method for managing communications comprising the steps of:

(a) issuing a token to a client process if the identity of the client process is authenticated using the authentication facility;

(b) in response to a call request from a client process, determining where a token associated with the call request originated; and (c) enabling connection of the client process to the application server if the token originated from authentication by the authentication facility.

* * * * *